Patented Nov. 17, 1953

2,659,756

UNITED STATES PATENT OFFICE 2,659,756

DIAMMONIUM SALTS

Franz Häfliger, Basel, and Emil Girod, Riehen, near Basel, Switzerland, assignors to J. R. Geigy A. G., Basel, Switzerland, a Swiss firm No Drawing. Application June 30, 1952,
Serial No. 296,484

Claims priority, application Switzerland
July 11, 1951

2 Claims. (Cl. 260—567.6)

This invention concerns new diquaternary diammonium salts of the general formula:

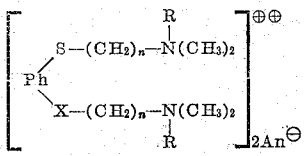

wherein

Ph represents a member selected from the group consisting of the ortho-phenylene and paraphenylene radicals, X represents a member selected from the group consisting of oxygen and sulphur, $n$ represents an integer from 2 to 3, R represents a lower aliphatic hydrocarbon radical, and An $\ominus$ represents a member selected from the group consisting of hydrochloric, hydrobromic, hydroiodic, methyl sulphuric and ethyl sulphuric acid anions.

It has been found that these new salts have an interesting pharmacological action on the tonus of the muscles. Thus, for example, 240γ of the dimetho-iodide of 1-(γ-dimethylaminopropoxy) - 4 - (γ - dimethylamino - propylmercapto)-benzene obtained according to Example 1 has the same contracting-inhibiting or reducing effect on the isolated rat diaphragm according to Buelbring-Trevan as 100γ of d-tubocurarine.

In contrast to this excellent action, in comparative trials analogous compounds such as for example the dimethoiodide of 1-(β-dimethylamino - ethoxy) - 4 - (β - dimethylamino - ethylmercapto)-benzene in which the two side chains are in the meta-position to each other, have practically no effect.

The diammonium compounds defined can be produced by reacting compounds of the general formula:

or salts thereof with two molecules of tertiary aminoalkyl halides of the general formulae:

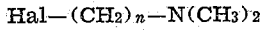

or

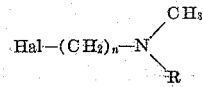

wherein Hal represents chlorine, bromine or iodine and Ph, X, R and $n$ have the meanings given above and then treating the ditertiary diamines with two molecules of low molecular alkylating agent or just with methylating agents.

Monothio- and dithio-brenzcatechin and monothio- and dithio-hydroquinone are the starting materials of the general formula:

They can be reacted as such or in the form of their salts with β-dimethylamino-ethyl- or γ-dimethylamino-propyl chloride, -bromide, or -iodide to form the following bis-dimethylaminoalkyl compounds:

1 - (β - dimethylamino - ethoxy) - 2 - (β - dimethylamino-ethylmercapto)-benzene,
1 - (γ - dimethylamino - propoxy) - 2 - (γ - dimethylamino-propylmercapto)-benzene,
1.2 - bis - (β - dimethylamino - ethylmercapto)-benzene,
1.2 - bis - (γ - dimethylamino - propylmercapto)-benzene,
1 - (β - dimethylamino - ethoxy) - 4 - (β - dimethylamino-ethylmercapto)-benzene,
1 - (γ - dimethylamino - propoxy) - 4 - (γ - dimethylamino-propylmercapto)-benzene,
1.4 - bis - (β - dimethylamino - ethylmercapto)-benzene,
1.4 - bis - (γ - dimethylamino-propylmercapto)-benzene.

The following, e. g. are corresponding bis-alkylmethylamino-alkyl compounds:

1 - (β - ethylmethylamino - ethoxy) - 2 - (β-ethylmethylamino-ethylmercapto)-benzene,
1 - (β - butylmethylamino - ethoxy) - 4 - (β-butylmethylamino - ethylmercapto) - benzene, and
1 - (γ - propylmethylamino - propoxy) - 4 - (γ-propylmethylamino-propylmercapto)-benzene.

These ditertiary diamines are suitable, for example, as starting materials for the direct production of dimethosulphates of diquaternary compounds wherein R does not represent methyl radicals.

If the thiophenols are not converted before the reaction into salts by means of bases, then it is advantageous to perform the reaction in the presence of a solvent and a base which binds the hydrohalic acid which splits off. Suitable bases are e. g. sodium amide, lithium amide, sodium hydride, sodium methylate, sodium hydroxide and potassium hydroxide. If alkali amides are used, neutral solvents and those having no hydroxyl groups such as diethyl ether, dibutyl ether, dioxan, benzene, toluene, xylenes and paraffin hydrocarbons are suitable, in addition alcohols such as ethanol or butanol are suitable if alcoholates are used and, if alkali hydroxides are used, water is also suitable. The reaction is performed at moderate temperatures, between 0–150°.

The following compounds for example come into question as methylating agents and further alkylating agents by means of which the ditertiary diamino compounds can be converted into diammonium compounds: methyl chloride, methyl bromide, methyl iodide, dimethyl sulphate, ethyl chloride, ethyl bromide, ethyl iodide, diethyl sulphate, propyl bromide, propyl iodide, butyl and isobutyl bromide and iodide, amyl and isoamyl bromide and iodide as well as allyl bromide and allyl iodide. If necesary the reaction is performed in a closed vessel in the presence or absence of solvents.

As the pharmacological activity of the diquaternary diammonium salts according to this invention depends chiefly on the cation, the type of anion used in this invention is of lesser importance. The choice of the anion is determined, therefore, not only by pharmacological but also by various other factors such as accessibility of the alkylating agent, facility of reaction, crystallisability (possibility of purification) and water solubility of the products, so that from case to case, the most suitable solution can easily be found by a few trials.

In the quaternary ammonium salts particularly described in the following examples, the anion is an iodine ion. Apart from direct addition of the alkylating agent, salts with other anions can also be produced from the quaternary salts obtained by direct addition by double reaction according to methods known per se or by reacting the ammonium base with a hydrohalic or alkyl sulphuric acid.

The greater part of the diquaternary ammonium salts are compounds which form almost colourless crystals. To crystallise, particularly organic solvents or suitable mixtures of such and possibly with water are suitable, e. g. mixtures of agents having good solvent properties such as alcohols or water with those having not so good solvent properties such as acetone. The new salts dissolve in water with an almost neutral reaction.

The following examples serve to further illustrate the production of the new salts. Where not otherwise stated, parts are always given as parts by weight in grammes and their relationship to parts by volume is that of grammes to cubic centimetres. The temperatures are in degrees centigrade.

*Example 1*

12.6 parts of monothiohydroquinone, 30.0 parts of γ-dimethylamino propyl chloride and 100 parts by volume of abs. toluene are heated to 40–50° in a pure nitrogen atmosphere and then a suspension of 11.3 parts of finely ground sodium amide in toluene is slowly added in small portions while stirring. The whole is then stirred for 2 hours at 40–50° and then boiled under reflux for 4 hours. After cooling, sufficient 2 N hydrochloric acid is added while stirring to keep the aqueous layer acid to Congo red, the toluene layer is separated and washed with a little water. The united hydrochloric acid and aqueous solution is washed with ether, clarified by filtration (possibly with a little animal charcoal) and then made strongly alkaline to mimosa with 30% caustic soda lye. The base which precipitates is taken up in ether by shaking out twice. After drying the ether solution with potassium carbonate and distilling off all volatile parts (finally at 90–100° under 0.1 mm. pressure), 1-(γ-dimethylaminopropoxy) - 4 - (γ - dimethylamino-proylmercapto)-benzene is obtained as an oil which can be clarified and made somewhat lighter in colour if necessary by filtration with charcoal or other similar agents.

2.96 parts of this base are dissolved in 10 parts by volume of abs. methanol and 2 parts by volume of methyl iodide are added. The reaction which takes place is moderated by gentle cooling in ice water. The reaction product is then allowed to stand for 14 hours at about 30° after which time dry ethyl acetate is carefully added so long as the solution remains clear. A sample can easily be made to crystallise by the addition of acetone, rubbing with a glass rod and cooling. A few crystals are added to the solution which is cooled to about —5°. After allowing to stand for several hours, the liquid is drawn off under suction, the crystals are washed with dry acetone and dried at 40–50° in the vacuum. The dimetho-iodide of 1-(γ-dimethylamino-propoxy)-4 - (γ - dimethylamino - propylmercapto) - benzene melts at about 220° on decomposition.

*Example 2*

A sodium methylate solution prepared from 5.5 parts of sodium with as little abs. methanol as possible is added to 15 parts of monothiobenzcatechin and 500 parts by volume of abs. toluene in a nitrogenous atmosphere. The methanol is distilled off over a column, then 26 parts of dimethylaminoethyl chloride in 100 parts by volume of abs. toluene are added dropwise to the mixture which is boiling under reflux and the whole is boiled for some hours. The mixture is cooled and 1-(β-dimethylaminoethoxy)-2-(β-dimethylamino-ethylmercapto)-benzene is isolated as described in Example 1.

8 parts of this base are dissolved in 50 parts by volume of acetone, 13 parts of methyl iodide are added while gently cooling and finally the whole is boiled under reflux for some hours. After cooling, the dimetho-iodide of 1-(β-dimethylaminoethoxy) - 2 - (β - dimethylaminoethylmercapto)-benzene is drawn off under suction and is crystallised, if desired from alcohol with the addition of a little water. M. P. about 278–280° on decomposition.

The dietho-iodide of 1-(β-dimethylaminoethoxy) - 2 - (β - dimethylamino - ethylmercapto)-benzene which is produced in an analogous manner melts at about 188°.

Also 1 - (β - dimethylamino - ethoxy) - 4 - (β - dimethylamino - ethylmercapto) - benzene for example can be produced according to the processes described in Examples 1 and 2. Its dimethoiodide melts at about 273° on decomposition, the dietho-iodide melts at about 233–236°.

The dimetho - iodide of 1.4 - bis - (γ - dimethylamino - propylmercapto) - benzene melts at 268° on decomposition.

Also the dimetho-iodides and dietho-iodides of 1 - (γ - dimethylamino - propoxy) - 2 - (γ - dimethylamino - propylmercapto) - benzene, 1.2 - bis - (β - dimethylamino - ethylmercapto) - benzene, 1.2 - bis - (γ - dimethylamino - propylmercapto) - benzene and 1.4 - bis - (β - dimethylamino - ethylmercapto) - benzene can be produced in an analogous manner.

Further, the dimethochlorides, dimethobromides, dimethosulphates, diethochlorides, diethobromides, diethosulphates, dipropobromides, dipropo-iodides, dibutobromides, dibuto-iodides, di-isobutobromides, di-isobuto-iodides, diamylo-iodides, diallylobromides and diallylo-iodides of the above mentioned ditertiary diamino compounds and also of 1 - (β - dimethylamino - ethoxy) - 2 - (β - dimethylamino - ethylmercapto) - benzene, 1 - (β - dimethylamino - ethoxy) - 4 - (β - dimethylamino - ethylmercapto) - benzene, 1 - (γ - dimethylamino - propoxy) - 4 - (γ - dimethylamino - propylmercapto) - benzene and 1.4 - bis - (γ - dimethylamino - propylmercapto) - benzene can be produced in the same way.

What we claim is:

1. A diquaternary diammonium salt of the general formula:

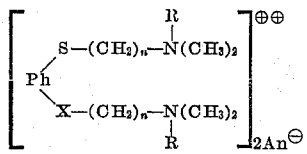

wherein

Ph represents a member selected from the group consisting of the ortho-phenylene and paraphenylene radical, X represents a member selected from the group consisting of oxygen and sulphur, n represents an integer from 2 to 3, R stands for lower alkyl, and An⊖ represents a member selected from the group consisting of hydrochloric, hydrobromic, hydroiodic, methyl sulphuric and ethyl sulphuric acid anions.

2. The dimetho - iodide of 1 - (γ - dimethylamino - propoxy) - 4 - (γ - dimethylamino - propylmercapto) - benzene of the formula:

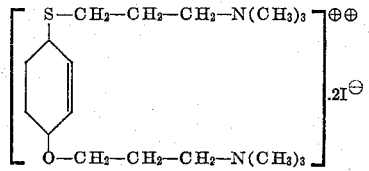

FRANZ HÄFLIGER.
EMIL GIROD.

References Cited in the file of this patent
UNITED STATES PATENTS

| Number | Name | Date |
|---|---|---|
| 2,087,131 | Taub et al. | July 13, 1937 |
| 2,544,076 | Fourneau | Mar. 6, 1951 |